US008892123B2

(12) United States Patent (10) Patent No.: US 8,892,123 B2
Krantz et al. (45) Date of Patent: Nov. 18, 2014

(54) IDENTIFYING MEETING ATTENDEES USING INFORMATION FROM DEVICES

(75) Inventors: Anton W. Krantz, Kirkland, WA (US); Ankit Tandon, Bellevue, WA (US); Jason R. Tuck, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/413,674

(22) Filed: Mar. 7, 2012

(65) Prior Publication Data

US 2013/0237240 A1 Sep. 12, 2013

(51) Int. Cl.
*H04W 4/02* (2009.01)
(52) U.S. Cl.
USPC ......... 455/456.1; 370/338; 370/328; 370/260
(58) Field of Classification Search
CPC ............ H04W 4/02; H04W 4/04; H04W 8/00
USPC ........ 455/456.1; 370/338, 328, 260; 382/115; 705/7.19; 348/14.08
See application file for complete search history.

(56) References Cited

U.S. PATENT DOCUMENTS

| 6,885,388 | B2 | 4/2005 | Gunter et al. | |
|---|---|---|---|---|
| 7,012,630 | B2 | 3/2006 | Curry et al. | |
| 7,328,029 | B1* | 2/2008 | Adamczyk et al. | 455/456.3 |
| 7,426,197 | B2* | 9/2008 | Schotten et al. | 370/328 |
| 7,477,281 | B2 | 1/2009 | Chandra et al. | |
| 2004/0141605 | A1 | 7/2004 | Chen et al. | |
| 2005/0058125 | A1* | 3/2005 | Mutikainen et al. | 370/354 |
| 2006/0239212 | A1* | 10/2006 | Pirzada et al. | 370/260 |
| 2007/0188596 | A1 | 8/2007 | Kenoyer | |
| 2007/0211673 | A1* | 9/2007 | Anantha | 370/338 |
| 2009/0015658 | A1 | 1/2009 | Enstad et al. | |
| 2009/0086949 | A1 | 4/2009 | Caspi et al. | |
| 2009/0089055 | A1 | 4/2009 | Caspi et al. | |
| 2009/0148827 | A1 | 6/2009 | Argott | |
| 2009/0203317 | A1 | 8/2009 | Waung | |
| 2009/0210491 | A1 | 8/2009 | Thakkar et al. | |
| 2010/0005142 | A1* | 1/2010 | Xiao et al. | 709/204 |

(Continued)

OTHER PUBLICATIONS

Waibel, et al., "SMaRT: The Smart Meeting Room Task at ISL", Retrieved at <<http://ieeexplore.ieee.org/stamp/stamp.jsp?tp=&arnumber=1202752>>, Proceedings of IEEE International Conference on acoustics, Speech, and Signal Processing, Apr. 6-10, 2003, pp. 752-755.

(Continued)

*Primary Examiner* — Jinsong Hu
*Assistant Examiner* — Jean Chang
(74) *Attorney, Agent, or Firm* — Andrew Smith; Jim Ross; Micky Minhas

(57) ABSTRACT

Physical presence of a mobile device in proximity to a physical meeting place can be recognized. Identifying information can be retrieved from the device, and it can be determined whether the identifying information correlates to identifying information for a profile in an invitee list for a current meeting at the meeting place. If the retrieved identifying information correlates to identifying information for the profile in the invitee list for the meeting at the meeting place, then the profile can be included as an attendee at the meeting (e.g., by including identifying information for the profile in an attendee list). The identifying information such as the attendee list may also be used to perform one or more additional acts, such as sending notifications, personalizing settings, etc.

20 Claims, 5 Drawing Sheets

(56) References Cited

U.S. PATENT DOCUMENTS

| | | | |
|---|---|---|---|
| 2010/0085415 | A1 | 4/2010 | Rahman |
| 2010/0149305 | A1 | 6/2010 | Catchpole et al. |
| 2010/0235894 | A1 | 9/2010 | Allen, Jr. et al. |
| 2010/0241845 | A1 | 9/2010 | Alonso |
| 2011/0161212 | A1 | 6/2011 | Bozionek et al. |
| 2011/0165858 | A1* | 7/2011 | Gisby et al. .................. 455/411 |
| 2011/0279631 | A1 | 11/2011 | Ranganath et al. |
| 2011/0283345 | A1 | 11/2011 | Kamei et al. |
| 2012/0185291 | A1* | 7/2012 | Ramaswamy et al. ....... 705/7.19 |
| 2012/0327175 | A1* | 12/2012 | Couse ........................ 348/14.08 |

OTHER PUBLICATIONS

Krantz, et al., Local Participant Identification in a Web Conferencing System, U.S. Appl. No. 13/116,006, filed May 26, 2011, pp. 31.

Hradis, et al., "Real-time Tracking of Participants in Meeting Video", Retrieved at <<http://citeseerx.ist.psu.edu/viewdoc/download?doi=10.1.1.147.289&rep=rep1&type=pdf>>, 2006, pp. 5.

Charif, et al., "Tracking the Activity of Participants in a Meeting", Retrieved at <<http://citeseerx.ist.psu.edu/viewdoc/download?doi=10.1.1.106.9832&rep=rep1&type=pdf>>,2006, pp. 1-14.

"Cisco Unified Videoconferencing 3545 System Release 5.7", Retrieved at <<http://www.cisco.com/en/US/prod/collateral/video/ps7190/ps1870/ps6963/product_data_sheet0900aecd804bbfc0.pdf>>, Retrieved Date: Feb. 22, 2011, pp. 8.

"International Search Report", Mailed Date: Jun. 27, 2013, Application No. PCT/US2013/027544, Filed date: Feb. 25, 2013, pp. 9.

Office Action, U.S. Appl. No. 13/116,006, filed May 26, 2011, Notification Date: Feb. 27, 2013, 17 Pages.

Office Action, U.S. Appl. No. 13/116,006, filed May 26, 2011, Notification Date: Oct. 3, 2013, 16 Pages.

Office Action, U.S. Appl. No. 13/116,006, filed May 26, 2011, Notification Date: Jun. 5, 2014, 14 pages.

* cited by examiner

SOFTWARE 180 IMPLEMENTING IDENTIFICATION OF MEETING
ATTENDEES USING INFORMATION FROM DEVICES

IDENTIFYING MEETING ATTENDEES USING INFORMATION FROM DEVICES

BACKGROUND

In a meeting containing local and remote attendees, identification of attendees in a local meeting room can be difficult, particularly for remote attendees who have a limited view of the room. Identification of online attendees can be easier because identifying information from profiles for online attendees (e.g., an attendee's name) is typically shown in a conference attendee list. In the case of a meeting room, typically the roster only includes identifying information for the profile of the room or for the profile of the person running the meeting in the room, even if there are multiple attendees present in the room.

SUMMARY

The description herein relates to identification of attendees based on mobile devices in proximity to a meeting place, such as a conference room. A device can be recognized and identifying information from the device can be correlated with information from an invitee list for a current meeting at the meeting place, to identify attendees at the meeting. That correlation can be used in one or more of various ways, such as to automatically compile a meeting attendee list, to send out notices to invitees who are not yet attending, to send out notices for attendees, and/or to personalize the meeting place for attendees.

In one embodiment, the tools and techniques can include recognizing physical presence of a mobile device in proximity to a physical meeting place. Identifying information can be retrieved from the device, and it can be determined whether the identifying information correlates to identifying information for a profile in an invitee list for a current meeting at the meeting place. If the retrieved identifying information correlates to identifying information for the profile in the invitee list for the meeting at the meeting place, then the profile can be included as an attendee at the meeting (e.g., by including identifying information for the profile in an attendee list). The identifying information such as the attendee list may also be used to perform one or more additional acts, such as sending notifications, personalizing settings, etc.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
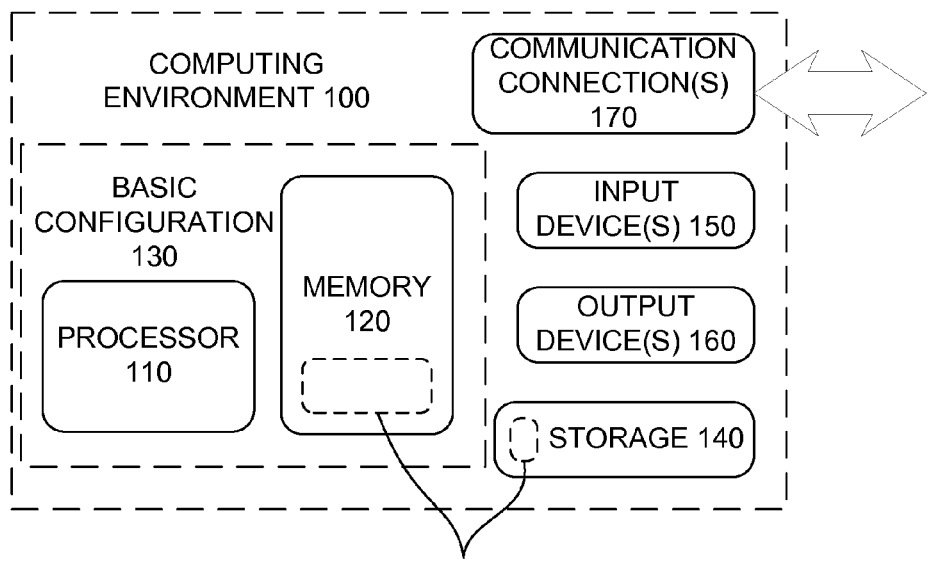
FIG. 1 is a block diagram of a suitable computing environment in which one or more of the described embodiments may be implemented.

Embodiments described herein are directed to techniques and tools for improved identification of meeting attendees. Such improvements may result from the use of various techniques and tools separately or in combination.

Such techniques and tools may include using devices capable of personal identification to add the names of local attendees to a meeting attendee list so that meeting attendees or participants can be identified. Recognition may use any of various different techniques to determine whether a mobile device is in proximity to the meeting place, such as using wireless signals (e.g., near field signals and/or location-identifying signals in combination with location techniques such as triangulation), gestures, card swipes, and/or other techniques. Such techniques can allow for a meeting computer system to identify attendees' user profiles and include corresponding identifying information (e.g., name, email alias, personal photograph, etc.) for a profile in the attendee list. This identification of user profiles associated with a mobile device is also referred to herein as identifying meeting attendees, although it is recognized that such identification of attendees might not be done with certainty. For example, a worker may walk into a meeting room carrying a co-worker's mobile device, so that the co-worker gets identified as an attendee. The attendee list can be displayed on one or more computer displays locally and/or remotely so that local and/or remote attendees can view the list. Identification of attendees may also be used in other ways, such as to notify others of an attendee's meeting attendance, to notify an absent invitee, and/or to personalize a meeting place for one or more attendees at that meeting place.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a mobile device for identification (e.g., a smart phone, slate device, laptop computer, etc.), a meeting computer system, an enterprise computer system, etc. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, slate devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing identification of meeting attendees using information from devices.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "recognize," "correlate," and "include" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Automatic Meeting Place Attendee Device Identification

Figure 2:
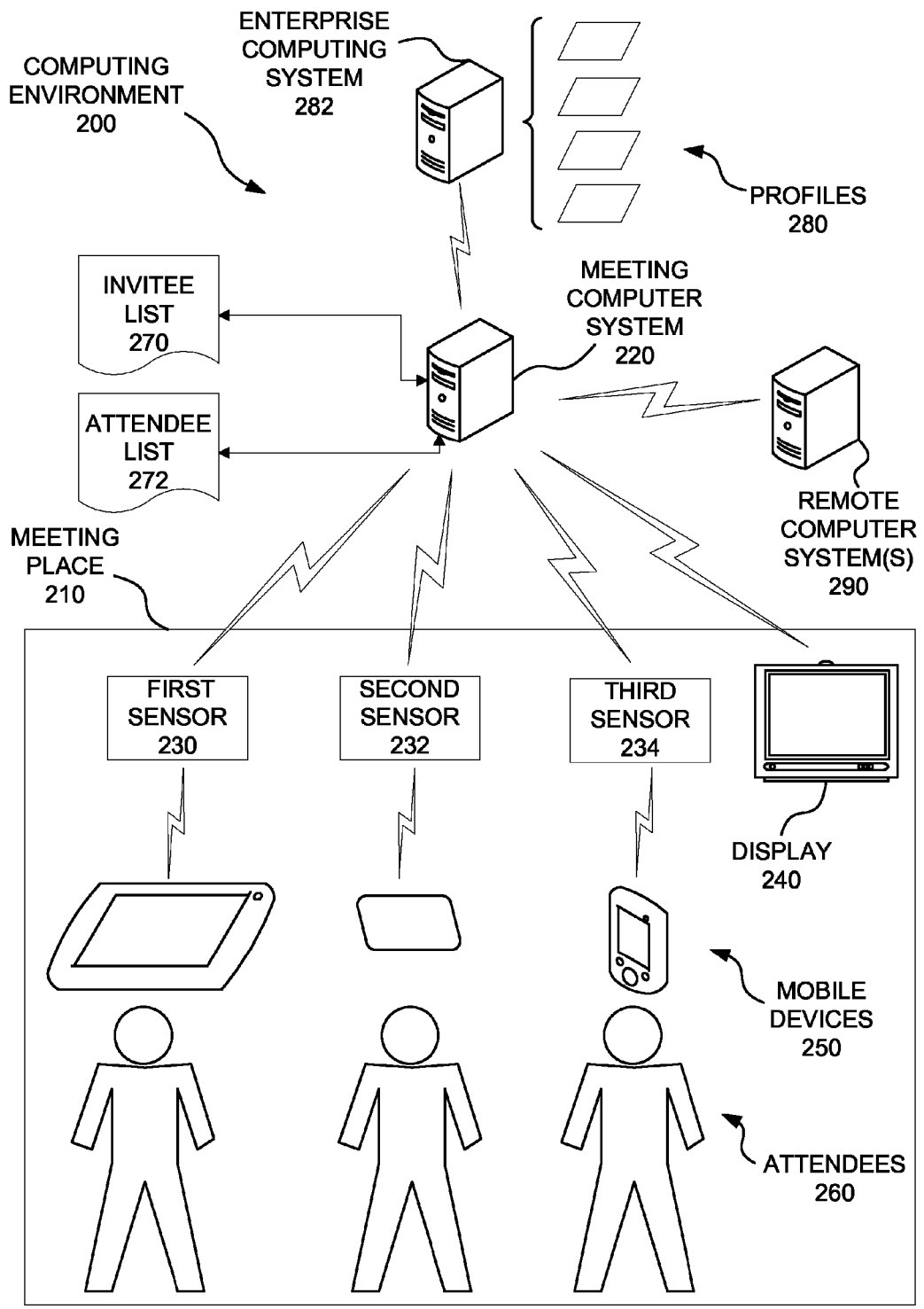
FIG. 2 is a schematic diagram of a computing environment for identifying meeting attendees using information from devices.

A. System and Environment for Identification of Meeting Attendees Using Information from Devices FIG. 2 is a block diagram of a computing environment (200) in conjunction with which one or more of the described embodiments may be implemented. The computing environment (200) can include a physical meeting place (210), such as a meeting room. A meeting computer system (220) can manage computer resources related to a meeting located at least partially in the meeting place (210). For example, the meeting computer system (220) can communicate with one or more sensors, such as a first sensor (230), a second sensor (232), and a third sensor (234). The sensors (230, 232, and 234) can be capable of retrieving units of identification information from mobile devices (250), which can identify profiles that can correspond to attendees (260) who possess the devices. The sensors (230, 232, and 234) may include multiple different types of sensors, such as sensors that can receive signals (e.g., electromagnetic or light signals). For example, the sensors could include radio frequency identification (RFID) tag readers, Wi-Fi and/or Bluetooth receivers, magnetic-stripe card readers, etc. The mobile devices (250) can include devices that can provide the identifying information units to the sensors (230, 232, 234), which can pass the identifying information units on to the meeting computer system (220).

The meeting computer system (220) can manage an invitee list (270), which can be one of various different types of data structures that can identify profiles that have been invited to the current meeting. The meeting computer system (220) can also manage an attendee list (272), which can be one of various different types of data structures that can identify profiles that are identified as attending the current meeting. For example, the meeting computer system (220) can determine whether identifying information units received from the sensors (230, 232, and/or 234) correspond to profiles (280) listed in the invitee list (270). If so, the meeting computer system (220) can automatically add identifications of those profiles (280) to the attendee list (272), which is also considered to be adding the profiles (280) to the attendee list (272). If a corresponding profile (280) is not indicated on the invitee list (270), then the meeting computer system (220) may be configured to respond in one or more of various ways, such as by prompting for user input to approve or deny inclusion of the identification of that profile in the attendee list (272), automatically including the identification of that profile in the attendee list (272), or automatically denying inclusion of the identification of that profile in the attendee list (272).

The profiles (280) can be user profiles, which may each correspond to one or more users. The profiles (280) may be managed by the meeting computer system (220) or by another computer system, such as an enterprise computing system (282), as illustrated in FIG. 2.

The computing environment (200) may also include one or more remote computer systems (290), such as remote computer system(s) (290) that manage one or more other meeting places for a meeting that includes the meeting place (210) and the one or more other meeting places. The computer systems (220, 282, and 290) of FIG. 2 may be connected by one or more wired and/or wireless computer networks, such as a global computer network, wide area networks, local area networks, etc.

B. Examples of Implementing Identification of Meeting Attendees Using Information from Devices Many individuals (for example business professionals) that are attendees (260) at meetings carry mobile devices (250), which are capable of identifying user profiles (280) associated with the attendees (260) to thereby identify the corresponding attendees (260). Examples of such mobile devices (250) may include employee badges, mobile phones, slate computing devices, and laptop computing devices.

For this example, consider a meeting attendee (260) with a mobile device (250) entering the meeting place (210) (e.g., a conference room) to participate in a meeting. For example, the meeting may be scheduled using an online meeting client, may be an ad hoc meeting with online participants, or may be a local meeting only. Once recognition has been performed, a profile (280) for the attendee (260) can be identified to the current meeting. For example, a user profile (280) for the attendee can be indicated in the attendee list (272), and the attendee list can be displayed on a computer display (240) at the meeting place (210) and/or at other remote meeting places that are involved in the meeting. Other proximity-based techniques may also be performed for the identified user profile (280), such as sending out notifications of meeting attendance, personalizing settings at the meeting place (210), etc.

1. Device Recognition

As one example, an attendee (260) with a mobile device (250) such as an employee badge with RFID tag can enter the meeting place (210) for a meeting. A sensor (232) at the meeting place (210) can be equipped with an RFID reader, which can recognize the RFID tag when the tag is in proximity to the meeting place.

As another example, an attendee (260) with a mobile device (250) such as a smart phone can enter the meeting place (210) for a meeting. The mobile device (250) can use location awareness using technologies such as global positioning system triangulation, Bluetooth triangulation, or Wi-Fi triangulation. The mobile device (250) can broadcast its location and a sensor (234) can recognize the mobile device (250) and retrieve identifying information from the mobile device (250), such as by using wireless signals. Alternatively, the meeting computer system (220) can broadcast the location of the meeting place (210) and the mobile device (250) can recognize that broadcast signal and send identifying information to the sensor (234). Accordingly, a mobile device (250) may determine proximity to the meeting place (210) by either broadcasting its location or by correlating its location to the location of the meeting place (210). Either way, the meeting place (210) and/or the mobile devices (250) can provide notification of location in a way that can be used for correlation of location between the meeting place (210) and the mobile devices (250). The correlation of location may be performed by the mobile devices (250), by the meeting computer system (220), or both.

For example, correlation may be performed by a mobile device (250) checking a location database (for example in an E911 enabled environment) or by receiving a broadcast signal from the meeting computer system (220), the presence of which can indicate proximity. As another example, the meeting computer system (220) may include a computing device (which may or may not be connected to the remainder of the meeting computer system (220)), which can be recognized by the mobile devices (250). When a mobile device (250) receives the broadcast from the meeting computer system (220), the mobile device (250) can respond with an acknowledgement that the mobile device (250) is in proximity. As part of this acknowledgement, the mobile device (250) can provide a unit of identifying information to the meeting computer system (220) via a sensor (230, 232, or 234). For example, the mobile device (250) may send an indication of a name, employee identification number, email alias, digital certificate, a combination of two or more of these, etc. for a profile (280) that corresponds to the mobile device (250). In this case, the meeting computer system (220) may retrieve the identifying information by receiving the information sent by the mobile device (250). Alternatively, a sensor (230, 232, 234) may retrieve such information without the mobile device (250) sending the information. For example, this may be done where a sensor (232) is an RFID tag scanner and the mobile device (250) includes a passive RFID tag.

2. Attendee User Profile Identification & Addition to Attendee List

As noted above, the meeting computer system (220) can access and possibly manage an invitee list (270) for a meeting. When a mobile device (250) corresponding to a user profile (280) for an attendee (260) is determined to be in proximity to the meeting place (210), the meeting computer system (220) can search the invitee list (270) to determine if the user profile (280) is indicated in the invitee list (270) for the meeting scheduled at the meeting place (210). An indication of the user profile (280) (e.g., a name of the corresponding attendee (260)) can be added to the meeting roster or attendee list (272), either automatically or after prompting for and receiving user input.

The recognition and identification may be controlled by a variety of modifiable and user-selectable settings, such as opting in to have one's name automatically recognized, broadcasting device location, etc.

3. Additional Usage of Identification Information

When an attendee's mobile device (250) is recognized as being in proximity to the meeting place (210) and that attendee's profile (280) is identified, the identifying information may be used in one or more ways. For example, the meeting place (210) can automatically configure the meeting place (210) based on the preferences associated with the profile (280) and/or the nature of the meeting. For example, this may be done if it is indicated that the user profile (280) is the meeting organizer or the meeting presenter, or if the user profile is indicated as having started an ad hoc meeting in the meeting place (210). For example, if the meeting has been configured as a video conference, a front-of-room computer display (240) can be configured to show video. If the user prefers a specific camera vantage point, the appropriate camera can be selected as the default. The meeting computer system (220) can use metadata and provisioning information which has been configured previously to determine appropriate settings.

As another example of using the identification information, the meeting computer system (220) can send a notification of attendance for one or more of the user profiles (280). For example, the meeting computer system (220) may notify an attendees' administrative assistant that the attendee (260) is at the meeting place (210). This notification could include additional information, such as the location of the meeting place (210) (e.g., building and room number), the date and time for the meeting, the nature of the meeting, etc.

As another example, the meeting computer system (220) may send meeting notifications for profiles (280) that are listed on the invitee list (270) but are absent from an ongoing meeting. This could include the meeting computer system (220) comparing the attendee list (272) with the invitee list (270), and sending out meeting notices to one or more of the absent invitees. For example, an email could be sent to an address listed in each such invitee's user profile (280). Such notices could include information such as the location of the meeting place (210), the nature of the meeting, the current attendee list (272), etc.

III. Techniques for Identifying Meeting Attendees Using Information from Devices Several techniques for identification of meeting attendees using information from devices will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 3:
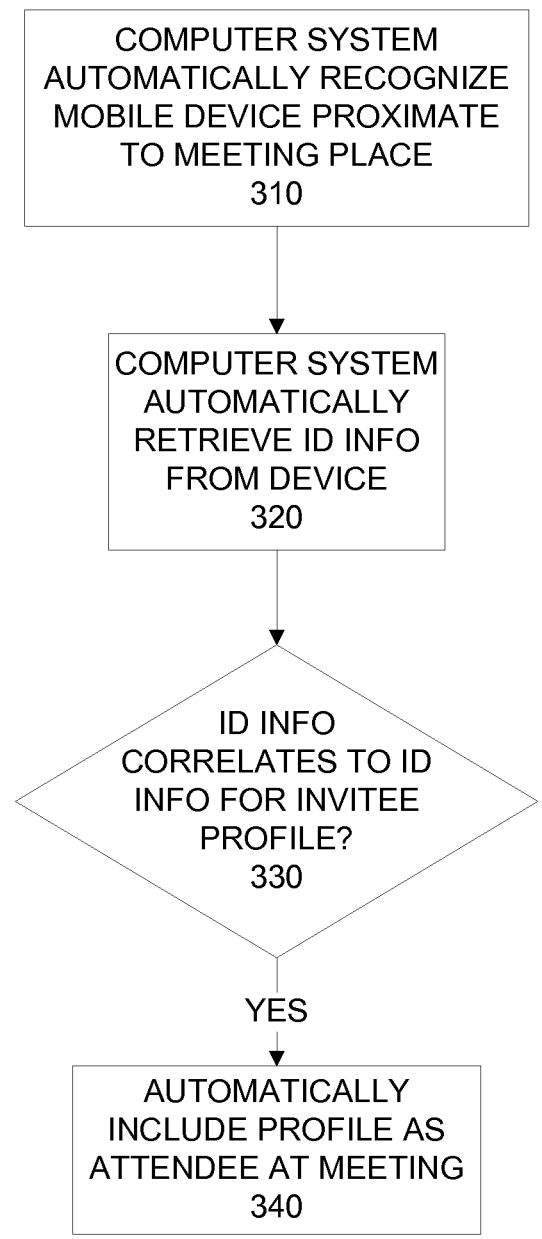
FIG. 3 is a flowchart of a technique for identifying meeting attendees using information from devices.

Referring to FIG. 3, a technique for identifying meeting attendees using information from devices. The technique can include a computer system automatically recognizing (310) physical presence of a mobile device in proximity to a physical meeting place. The computer system can automatically retrieve (320) identifying information from the device. The computer system can also automatically determine (330) whether the identifying information correlates to identifying information for a profile in an invitee list for a current meeting at the meeting place. If the retrieved identifying information correlates to identifying information for the profile in the invitee list for the meeting at the meeting place, then the technique can include automatically including (340) the profile as an attendee at the meeting. For example, including (340) the profile as an attendee at the meeting can include automatically including the profile in a list of meeting attendees for the meeting. This could include inserting an email alias, a name, and/or some other identifying information from the profile in the list of attendees for the meeting.

The technique may also include performing one or more other acts using the identification of the profile as a meeting attendee. For example, the technique may include displaying the list of meeting attendees on a local and/or remote computer display, such as one or more computer displays involved in a conference. As another example, the technique may include sending a notification indicating that the profile is included as an attendee at the meeting, where the notification may indicate information about the meeting such as the location of the meeting. As yet another example, the technique may include identifying one or more profiles that are on the invitee list but are not included as attendees at the meeting after the meeting has begun. The technique may include sending one or more notifications of the meeting to the one or more profiles that are on the invitee list but are not included as attendees at the meeting. As yet another example, the technique may further include automatically personalizing one or more settings at the meeting place for the profile.

Automatically recognizing (310) physical presence of the device in proximity to the physical meeting place may be done in one or more of various ways. For example, automatically recognizing (310) physical presence of the device may include receiving and/or sending a near field signal, receiving from the device a signal with an indicator that indicates the device is in proximity to the physical meeting place. Automatically recognizing (310) physical presence of the device may include comparing the location information from the device with location information for the physical meeting place.

If the identifying information does not correlate to identifying information for a profile in the invitee list, then the technique may include displaying a prompt to receive user input approving or denying inclusion of the profile as a profile at the meeting.

Figure 4:
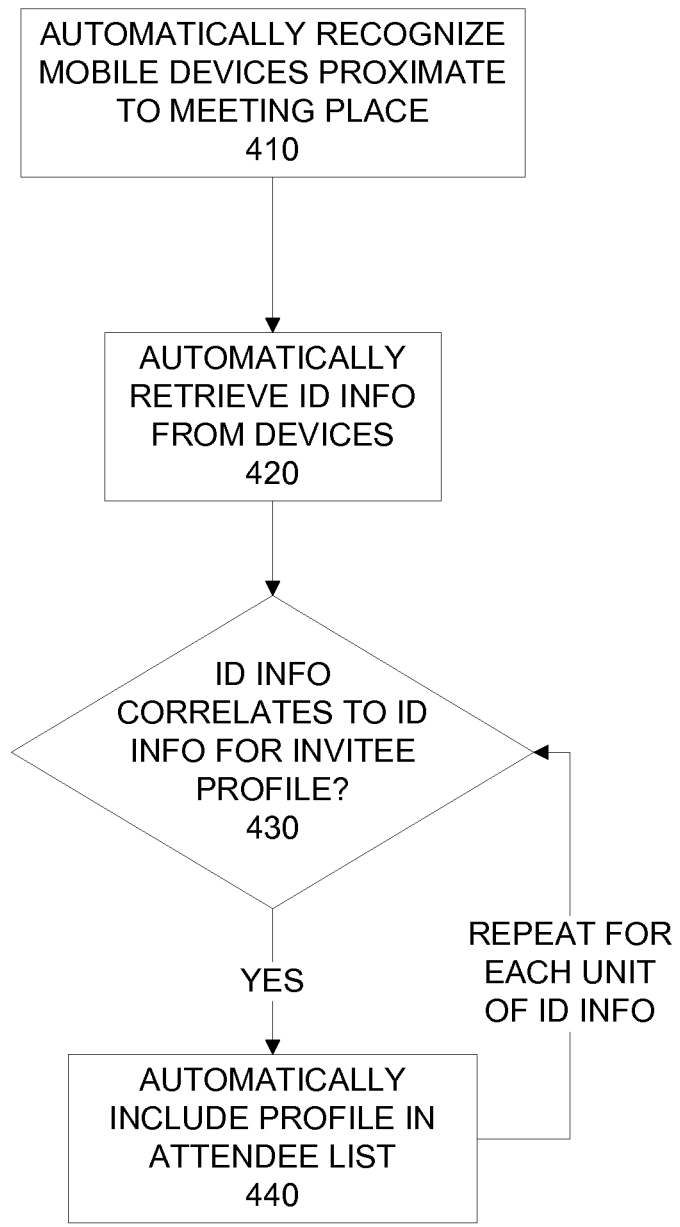
FIG. 4 is a flowchart of another technique for identifying meeting attendees using information from devices.

Referring to FIG. 4, another technique for identifying meeting attendees using information from devices will be described. The technique can include automatically recognizing (410) physical presence of mobile devices in proximity to a physical meeting place. The mobile devices may include a single type of device or multiple different types of mobile devices. The technique can also include automatically retrieving (420) a unit of identifying information from each of the mobile devices. For example, this unit of identifying information could be a device identification number, an employee identification number, a profile name, a profile email alias, and/or some other identifying information. The technique may further include automatically determining (430) whether each unit of identifying information correlates to identifying information for a profile in an invitee list for a current meeting at the meeting place. Additionally, for each unit of identifying information that correlates to identifying information for a profile in the invitee list for the meeting, automatically including (440) the profile in an attendee list for the meeting.

The technique may further include automatically sending one or more notifications of participation in the meeting for one or more of the profiles included in the attendee list for the meeting. The technique may include automatically personalizing the meeting place for one or more of the profiles included in the attendee list for the meeting. Also, the technique may include automatically identifying a profile in the invitee list that is not included in the attendee list and automatically sending a meeting notification for the profile.

Figure 5:
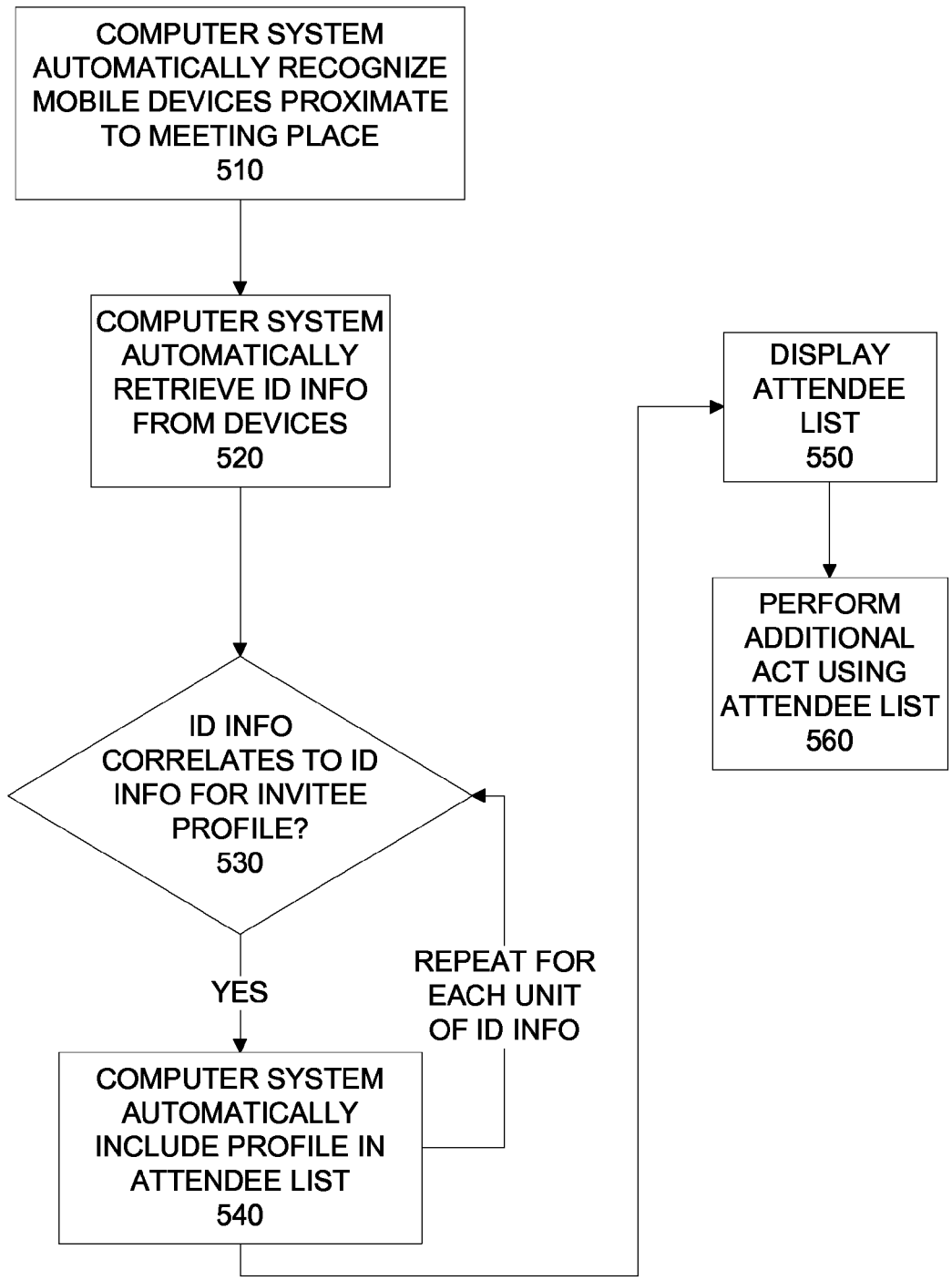
FIG. 5 is a flowchart of yet another technique for identifying meeting attendees using information from devices.

Referring to FIG. 5, yet another technique for identifying meeting attendees using information from devices will be described. The technique can include a meeting place computer system automatically recognizing (510) physical presence of mobile devices in proximity to a physical meeting place. The technique may further include the meeting place computer system automatically retrieving (520) a unit of identifying information from each of the mobile devices. Additionally, the technique may include the meeting place computer system determining (530) whether each unit of identifying information correlates to identifying information for a profile in an invitee list for a current meeting at the meeting place. For each unit of identifying information that correlates to identifying information for a profile in the invitee list for the meeting, the meeting place computer system can automatically include (540) the profile in the attendee list for the meeting. The technique can further include displaying (550) the attendee list on a computer display, and possibly on multiple computer displays (e.g., computer displays at different local and/or remote conference locations).

The meeting place computer system can perform (560) an additional act using the attendee list. The additional act can be an act selected from a group consisting of multiple different acts. For example, this group of acts may include personalizing the meeting place for one or more of the profiles included in the attendee list for the meeting, automatically identifying a profile in the invitee list that is not included in the attendee list and automatically sending a meeting notification for the profile, and automatically sending one or more notifications of participation in the meeting for one or more of the profiles included in the attendee list for the meeting. The technique may also include performing additional acts, such as multiple acts from this group or other acts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
 a computer system automatically recognizing physical presence of a first mobile device in proximity to a physical meeting place;
 the computer system automatically retrieving a first set of identifying information from the first device;
 the computer system automatically determining that the first set of identifying information from the first device correlates to identifying information for a first profile in an invitee list for a current meeting at the meeting place;
 in response to determining that the retrieved first set of identifying information correlates to identifying information for the first profile in the invitee list for the meeting at the meeting place, automatically including the first profile as an attendee at the meeting;
 the computer system automatically recognizing physical presence of a second mobile device in proximity to the physical meeting place;
 the computer system automatically retrieving a second set of identifying information from the second device;
 the computer system automatically determining that the second set of identifying information does not correlate to identifying information for a profile in the invitee list for the current meeting at the meeting place; and
 in response to determining that the second set of identifying information does not correlate to identifying information for a profile in the invitee list, automatically displaying a prompt that is configured to receive user input approving inclusion of a second profile corresponding to the second set of identifying information as a profile at the meeting, the prompt also being configured to alternatively receive user input denying inclusion of the second profile corresponding to the second set of identifying information as a profile at the meeting.

2. The method of claim 1, wherein automatically including the first profile as an attendee at the meeting comprises automatically including the first profile in a list of meeting attendees for the meeting.

3. The method of claim 2, further comprising displaying the list of meeting attendees on a computer display.

4. The method of claim 1, further comprising sending a notification to one or more user profiles that are not included as attendees at the meeting, the notification indicating that the first profile is included as an attendee at the meeting, wherein the sending of the notification indicating that the first profile is included as an attendee at the meeting is done prior to an ending time of the meeting.

5. The method of claim 4, wherein the notification indicates a location of the physical meeting place.

6. The method of claim 1, further comprising identifying one or more profiles that are on the invitee list but are not included as attendees at the meeting after the meeting has begun.

7. The method of claim 6, further comprising sending one or more notifications of the meeting to the one or more profiles that are on the invitee list but are not included as attendees at the meeting, the sending of the one or more notifications of the meeting being done while the meeting is ongoing.

8. The method of claim 1, wherein automatically recognizing physical presence of the device in proximity to the physical meeting place comprises receiving a near field signal.

9. The method of claim 1, wherein automatically recognizing physical presence of the device in proximity to the physical meeting place comprises sending a near field signal.

10. The method of claim 1, wherein automatically recognizing physical presence of the device in proximity to the physical meeting place comprises receiving from the device a signal comprising an indicator that indicates the device is in proximity to the physical meeting place.

11. The method of claim 1, wherein automatically recognizing physical presence of the device in proximity to the physical meeting place comprises comparing location information from the device with location information for the physical meeting place.

12. The method of claim 1, further comprising automatically personalizing one or more settings at the meeting place for the first profile.

13. A computer system comprising:
at least one processor; and
memory comprising instructions stored thereon that when executed by at least one processor cause at least one processor to perform acts comprising:
    automatically recognizing physical presence of mobile devices in proximity to a physical meeting place;
    automatically retrieving a unit of identifying information from each of the mobile devices;
    automatically determining whether each unit of identifying information correlates to identifying information for a profile in an invitee list for a current meeting at the meeting place;
    for each unit of identifying information that correlates to identifying information for an included profile in the invitee list for the meeting, automatically including the included profile in an attendee list for the meeting;
    for each unit of identifying information that does not correlate to identifying information for a profile in the invitee list for the meeting, automatically displaying a prompt that is configured to receive user input approving inclusion of a corresponding omitted profile as a profile at the meeting, the prompt also being configured to alternatively receive user input denying inclusion of the corresponding omitted profile as a profile at the meeting; and
    automatically identifying a profile in the invitee list that is not included in the attendee list; and
    automatically sending a meeting notification for the identified profile in the invitee list, the sending of the meeting notification being done while the meeting is ongoing.

14. The computer system of claim 13, wherein the acts further comprise automatically sending a notification of participation in the meeting for a profile of the profiles included in the attendee list for the meeting, the sending of the notification of participation comprising sending the notification of participation to one or more user profiles other than the profile that is included in the attendee list for the meeting.

15. The computer system of claim 13, wherein the acts further comprise automatically personalizing the meeting place for one or more of the profiles included in the attendee list for the meeting.

16. The computer system of claim 13, wherein the mobile devices comprise a plurality of different types of mobile devices.

17. One or more computer-readable storage media having computer-executable instructions embodied thereon that, when executed by at least one processor, cause at least one processor to perform acts comprising:
    a meeting place computer system automatically recognizing physical presence of mobile devices in proximity to a physical meeting place;
    the meeting place computer system automatically retrieving a unit of identifying information from each of the mobile devices;
    the meeting place computer system automatically determining whether each unit of identifying information correlates to identifying information for a profile in an invitee list for a current meeting at the meeting place;
    for each unit of identifying information that correlates to identifying information for a profile in the invitee list for the meeting, the meeting place computer system automatically including the profile in an attendee list for the meeting;
    for each unit of identifying information that does not correlate to identifying information for a profile in the invitee list for the meeting, automatically displaying a prompt that is configured to receive user input approving inclusion of a corresponding omitted profile as a profile at the meeting, the prompt also being configured to alternatively receive user input denying inclusion of the corresponding omitted profile as a profile at the meeting;
    displaying the attendee list on a computer display; and
    the meeting place computer system performing an additional act using the attendee list, the additional act being an act selected from a group consisting of automatically identifying a profile in the invitee list that is not included in the attendee list and automatically sending a meeting notification for the profile while the meeting is ongoing, and automatically sending one or more notifications of participation in the meeting for one or more of the profiles included in the attendee list for the meeting, the one or more notifications of participation being sent to one or more other user profiles that are not included in the attendee list for the meeting.

18. The one or more computer-readable storage media of claim 17, wherein the additional act is automatically identifying a profile in the invitee list that is not included in the attendee list and automatically sending a meeting notification for the profile prior to a scheduled ending time for the meeting.

19. The one or more computer-readable storage media of claim 18, wherein the acts further comprise automatically sending one or more notifications of participation in the meeting for one or more of the profiles included in the attendee list for the meeting, the one or more notifications of participation being sent to one or more other user profiles that are not included in the attendee list for the meeting.

20. The one or more computer-readable storage media of claim 18, wherein the meeting notification indicates a location for the physical meeting place, and the meeting notification indicates one or more profiles currently listed in the attendee list for the meeting.

* * * * *